US 6,590,388 B2

(12) United States Patent
Arnaout et al.

(10) Patent No.: US 6,590,388 B2
(45) Date of Patent: Jul. 8, 2003

(54) NON-DESTRUCTIVE DEFECTIVE MAGNETO-RESISTIVE HEAD DETECTION UTILIZING A MICRO-TRACK

(75) Inventors: Badih Mohamadnaji Arnaout, Loveland, CO (US); Harry Dale Maxwell, Fort Collins, CO (US); Alejandro Gabriel Laguna, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 15 days.

(21) Appl. No.: 09/892,154

(22) Filed: Jun. 26, 2001

(65) Prior Publication Data

US 2002/0032886 A1 Mar. 14, 2002

Related U.S. Application Data

(60) Provisional application No. 60/222,998, filed on Aug. 3, 2000.

(51) Int. Cl.[7] .............................................. G01R 33/12
(52) U.S. Cl. ...................................................... 324/210
(58) Field of Search ................................. 324/537, 210, 324/211, 212, 252; 360/77.07, 75, 137; 714/718; 702/115

(56) References Cited

U.S. PATENT DOCUMENTS

| | | | |
|---|---|---|---|
| 3,686,682 A | 8/1972 | Behr et al. ............ 340/174.1 B |
| 5,068,754 A | 11/1991 | Garde ........................... 360/45 |
| 5,130,866 A | 7/1992 | Klaassen et al. ............... 360/75 |
| 5,262,905 A * | 11/1993 | Takagi et al. .................. 360/53 |
| 5,382,887 A | 1/1995 | Guzik et al. ................. 318/652 |
| 5,691,857 A | 11/1997 | Fitzpatrick et al. ....... 360/77.06 |
| 5,778,514 A * | 7/1998 | Das .......................... 29/603.14 |
| 5,936,789 A | 8/1999 | Mukohara ................ 360/77.04 |
| 6,025,712 A | 2/2000 | Mian ........................... 324/210 |
| 6,025,971 A * | 2/2000 | Inoue et al. ............. 360/77.08 |
| 6,204,660 B1 * | 3/2001 | Lee ............................. 324/212 |
| 6,433,540 B1 * | 8/2002 | Hachisuka et al. ......... 324/210 |
| 6,504,362 B2 * | 1/2003 | Saunders et al. ........... 324/210 |
| 2002/0118473 A1 * | 8/2002 | Yong ........................... 360/31 |

* cited by examiner

*Primary Examiner*—Jay Patidar
(74) *Attorney, Agent, or Firm*—Merchant & Gould P.C.

(57) ABSTRACT

A method and apparatus for using control apparatuses and read/write apparatuses within a disc drive to create a microtrack that is used to probe the magnetic sensitivity of each portion of a magnetic stripe of a magneto-resistive read/write head in the disc drive. The method can be executed by first selecting a target track and then recording a test signal along the target track. Next, the target track is trimmed to create a microtrack, the microtrack having a microtrack width less than the stripe width, the microtrack having a first circumferential edge and a second circumferential edge. Subsequently, the magneto-resistive stripe is positioned at various radial locales traversing the microtrack, and at each locale the magneto-resistive stripe is used to read the test signal recorded on the microtrack, thereby producing a detected signal at each of the various locales. Finally, a signal-strength profile is determined.

22 Claims, 9 Drawing Sheets

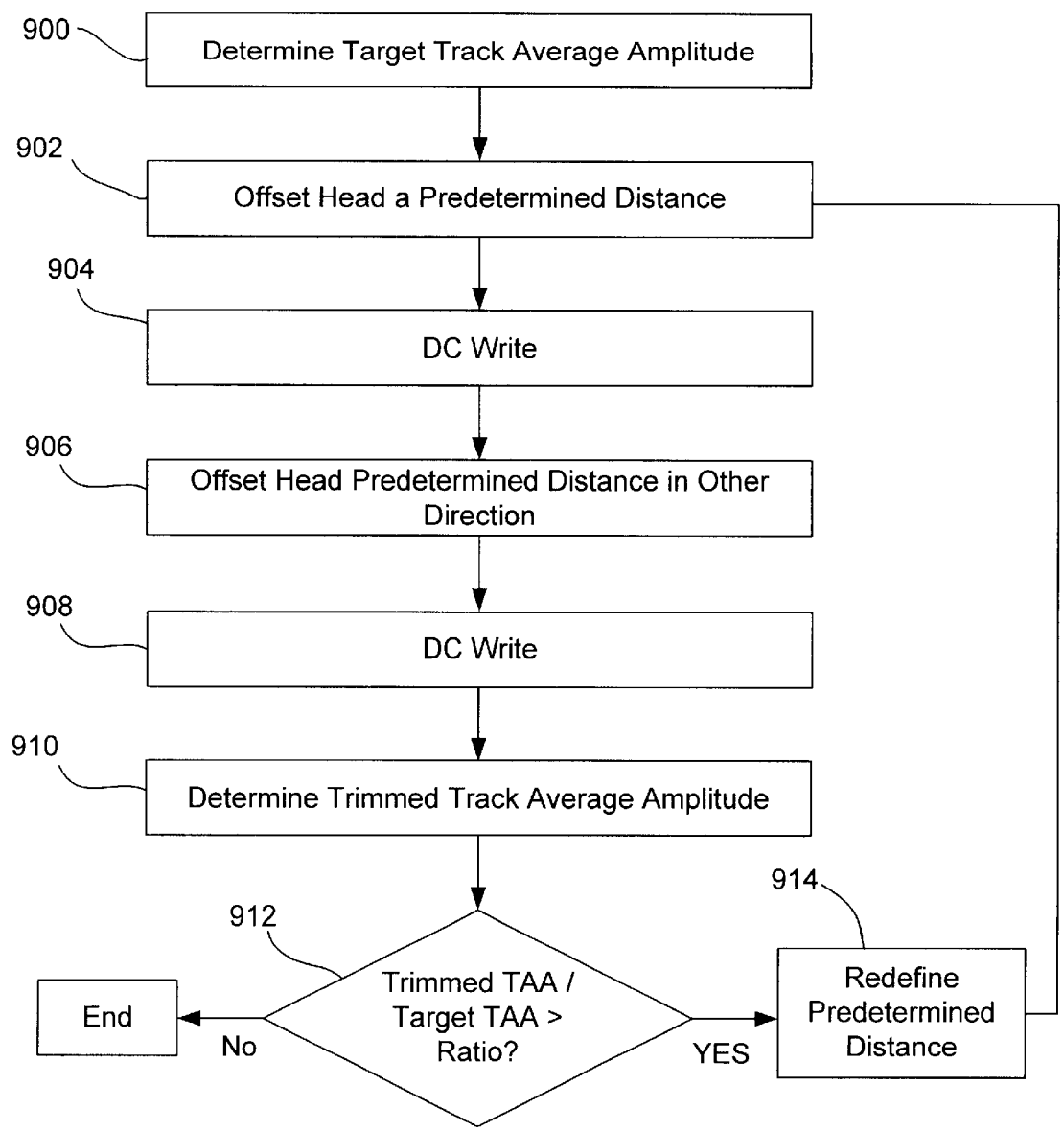

NON-DESTRUCTIVE DEFECTIVE MAGNETO-RESISTIVE HEAD DETECTION UTILIZING A MICRO-TRACK

RELATED APPLICATIONS

This application claims the benefit of the filing date of U.S. Provisional Patent Application Serial No. 60/222,998 filed Aug. 3, 2000 and entitled "MICRO TRACK PROFILE ON A DRIVE LEVEL."

FIELD OF THE INVENTION

This application relates to disc drives and more particularly to an apparatus and method for gathering data to detect a defect in a magneto-resistive head in a disc drive.

BACKGROUND OF THE INVENTION

Disc drives store data by creating localized magnetic fields on one or more flat, circular discs within the disc drive. Thus, the discs within the disc drive serve as a recording medium, and the localized magnetic fields serve as the means by which data are represented. Reading data that have been stored by a disc drive requires that the localized magnetic fields be detected, so that the data they represent can be reconstructed.

The localized magnetic fields can be detected by several mechanisms. One particular mechanism that is well suited for detecting the presence of a localized magnetic field is a magneto-resistive head. A magneto-resistive head is a small, magnetically sensitive element that changes its resistance when in the presence of variable magnetic flux. Accordingly, by orienting a magneto-resistive head over a spinning disc, the magneto-resistive head will detect the presence of localized magnetic fields stored on the disc spinning beneath it. By orienting the magneto-resistive head at a given distance from the center of the disc, the data stored along the particular circular path passing under the head (called a "track") will be read.

The magnetically sensitive element within a magneto-resistive head is called a "magnetic stripe." A magnetic stripe typically has a width about 80% of that of the track it is reading. Thus, the entire magnetic stripe is immersed in a particular localized magnetic field when the field is oriented, i.e., passes beneath, the magnetic stripe, and it is important that no portion of the magnetic stripe become damaged, lest the magneto-resistive head lose its ability to read the data stored upon the disc.

A magneto-resistive stripe is particularly sensitive to electrostatic discharges. A significantly low electrical potential can damage a magnetic stripe. Since electrostatic potentials may develop during the course of certain manufacturing operations (electrostatic potentials develop when two non-conducting materials rub together), it is important that a test be developed to monitor the damage sustained by the magnetic stripes over the course of their manufacture. Additionally, it is desirable that a test be developed which can be performed with the disc drive fully assembled, so as not to require the disassembly or destruction of the disc drive under test. Testing a fully assembled drive permits a magneto-resistive head to be examined inexpensively, and without introducing other error factors caused by opening the drive.

SUMMARY OF THE INVENTION

The method and apparatus in accordance with the present invention solves the aforementioned problem and other problems by using control mechanisms and read/write apparatuses within a disc drive to create a microtrack that is used to probe the magnetic sensitivity of each portion of the magnetic stripe within the magneto-resistive head of the disc drive. More specifically, a method can be executed to produce a signal-strength profile for a magneto-resistive stripe, by first selecting a target track, and then recording a test signal along the target track. Next, the target track is trimmed to create a microtrack wherein the microtrack has a microtrack width less than the stripe width. The microtrack thus formed has a first circumferential edge and a second circumferential edge. After the creation of the microtrack, the magneto-resistive stripe is scanned at various radial locations between the first and second circumferential edges of the microtrack. Finally, a signal strength is determined for each of the detected signals.

A test system composed of a computer, an oscilloscope, and a disc drive under test can cooperate to perform the above-described steps, thereby collecting the data necessary to create a signal-strength profile for a magneto-resistive stripe within the disc drive under test.

BRIEF DESCRIPTION OF THE DRAWINGS

FIG. 9 depicts a set of acts that can be executed, in order to trim a target track to create a microtrack.

DETAILED DESCRIPTION OF THE INVENTION

The magnetic sensitivity of portions of a magneto-resistive stripe can be characterized by using the magneto-resistive stripe to read a track that has been trimmed to be narrower than the magneto-resistive stripe. Because the trimmed track (called a "microtrack") is narrower than the magneto-resistive stripe, the signal detected by the magneto-resistive stripe is due chiefly to the magnetic responsiveness of the portion of the magneto-resistive stripe positioned over the microtrack. Thus, if the portion of the magneto-resistive stripe oriented over the microtrack is magnetically unresponsive, the signal detected by the magnetic head will be weak, and it will be revealed that the magnetic stripe has a defective portion. A test system operating based upon this principle is disclosed herein. This test system can be used upon an assembled disc drive and does not require the disassembly or destruction of the disc drive.

Figure 1:
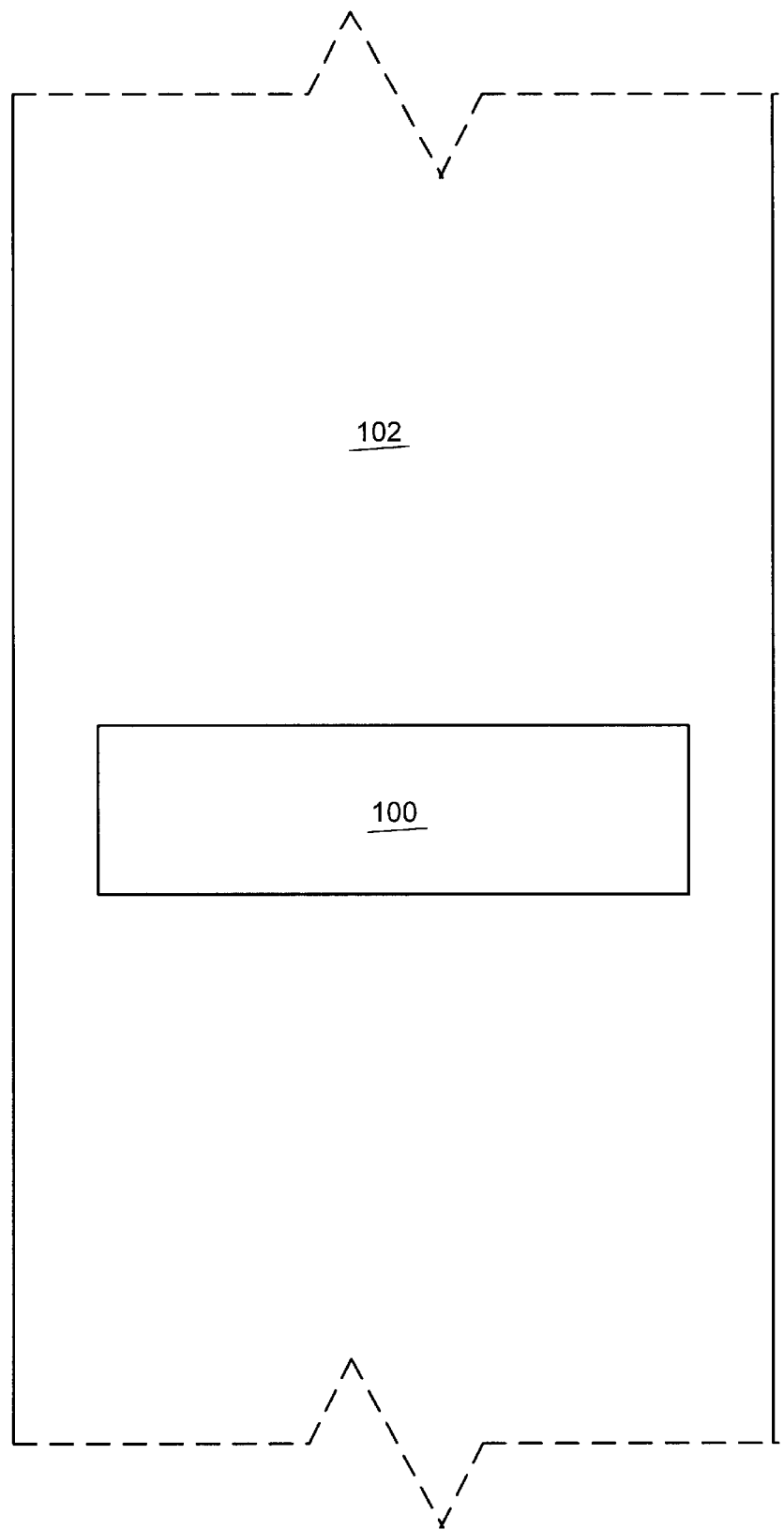
FIG. 1 depicts a magneto-resistive stripe oriented over a linearized representation of a track.

FIG. 1 depicts a magneto-resistive stripe 100 oriented over a linearized representation of a track 102. As can be seen in FIG. 1, a track 102 is typically wider than the magneto-resistive stripe 100 used to read the track. A magneto-resistive stripe may be in the range of 80% as wide as the track it reads. Accordingly, when the magneto-resistive stripe 100 is oriented over the track 102 to read the data stored thereon, the entire magneto-resistive stripe 100 is immersed in the localized magnetic fields contained on the track 102.

Figure 2:
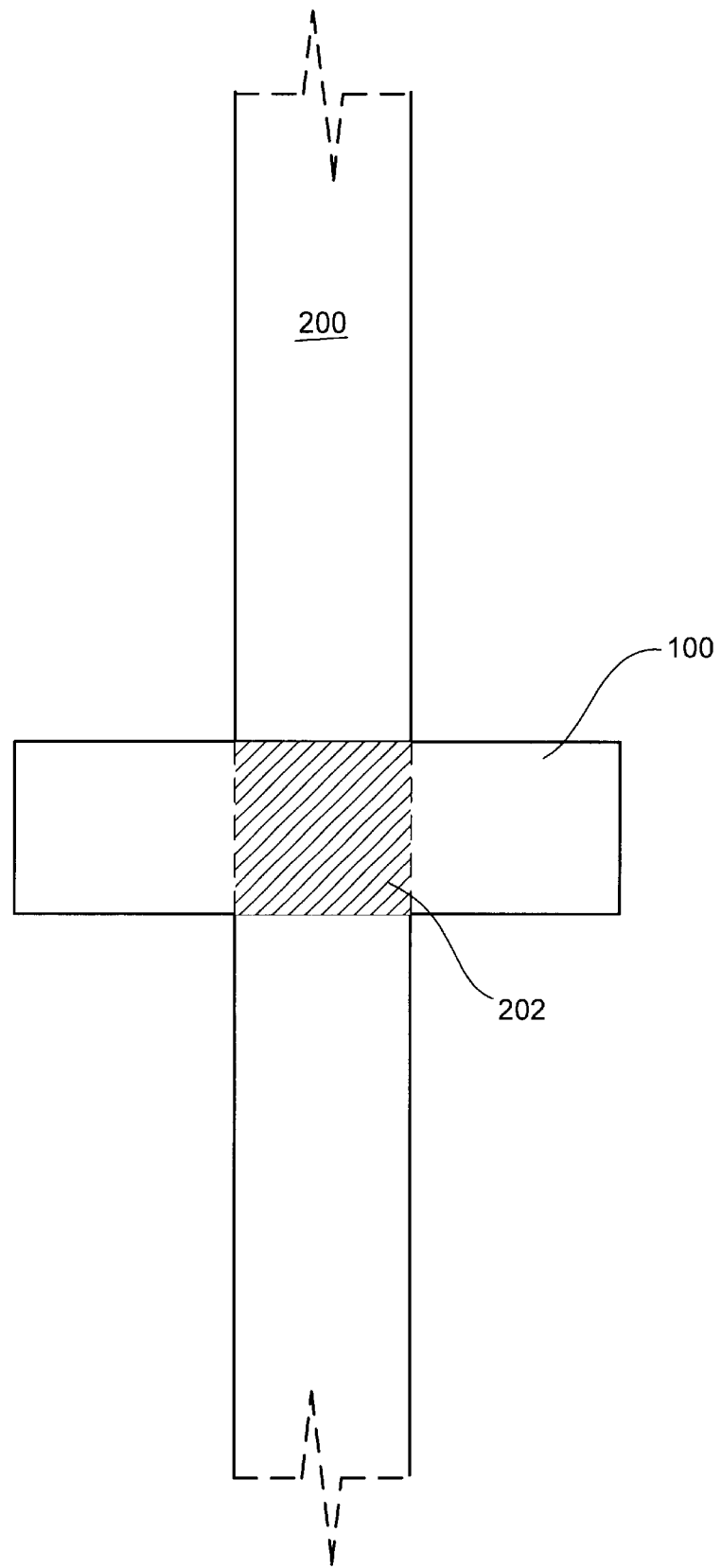
FIG. 2 depicts a magneto-resistive stripe oriented over a linearized representation of a microtrack.

FIG. 2 shows a linearized representation of a track 200 that has been trimmed to be narrower than the magneto-resistive stripe 100. Because track 200 is narrower than the magneto-resistive stripe 100, track 200 is referred to as a "microtrack" 200. When the magneto-resistive stripe 100 is used to read the information stored on microtrack 200, the signal yielded by the magneto-resistive head is due chiefly to the magnetic responsiveness of the region 202 of the magneto-resistive stripe 100 oriented over microtrack 200. If the region 202 of the magneto-resistive stripe 100 oriented over the microtrack 200 is magnetically unresponsive, the signal detected by the magnetic head will be weak, and it will be revealed that the magnetic stripe 100 has a defective portion.

Figure 3:
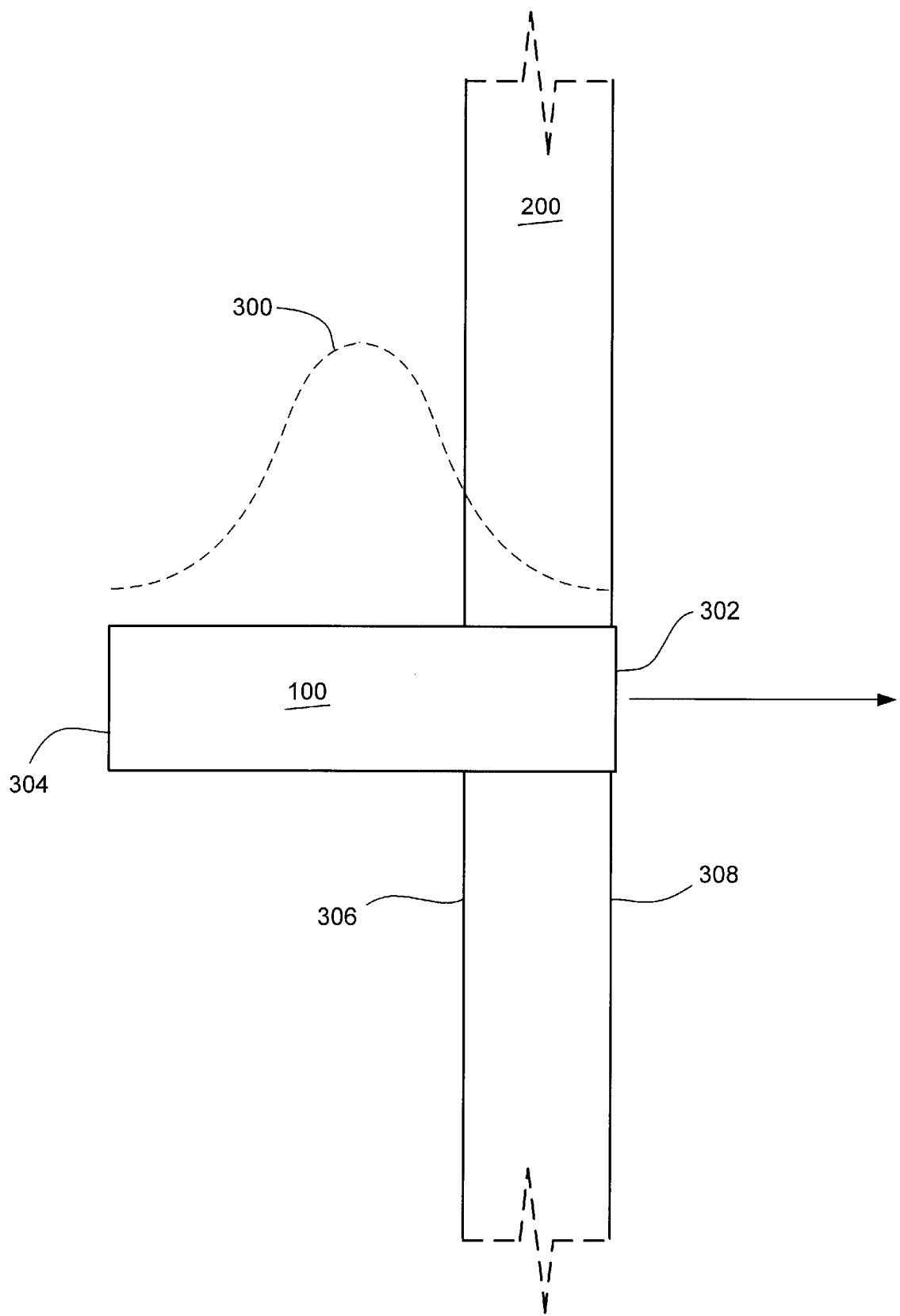
FIG. 3 depicts a magneto-resistive stripe being moved across a microtrack, thereby permitting a signal-strength profile to be determined.

FIG. 3 depicts a signal-strength profile 300 of a properly functioning magneto-resistive stripe 100. Signal-strength profile 300 is a curve that results from plotting signal strength (y-axis) against stripe position (x-axis). Signal-strength profile 300 can be arrived at by: (1) orienting magneto-resistive stripe 100 at various locales about microtrack 200; (2) using the magneto-resistive stripe 100 to detect a signal due to the data stored on microtrack 200; and (3) calculating the signal-strength of each of the detected signals. More specifically, magneto-resistive stripe 100 can be thought of as having a leading edge 302 and a trailing edge 304. The leading edge 302 is the edge that is forward-most with respect to the direction the magneto-resistive stripe 100 is moved across the microtrack 200. The microtrack can be thought to have a proximal edge 306 and a distal edge 308. The proximal edge 308 is the edge of the microtrack 200 that is rear-most with respect to the direction in which the magneto-resistive stripe 100 is being moved across the microtrack 200. The signal-strength profile 300 may be arrived at by positioning the leading edge 302 of the magneto-resistive stripe 100 outside of the proximal edge 306 of the microtrack 100 and moving the magneto-resistive stripe 100 across the microtrack 100 (periodically detecting the signal due to the data recorded on the microtrack), until the trailing edge 304 of the magneto-resistive stripe 100 meets the distal edge 308 of the microtrack 200. The strength of the detected signal will vary with the position of the magneto-resistive stripe 100 relative to the microtrack 200. For example, if magneto-resistive stripe 100 is positioned so that its leading edge 302 is located atop distal edge 308, the strength of the signal detected by the magneto-resistive head will be relatively weak. As the magneto-resistive stripe 100 is moved so as to have its central-portion located atop microtrack 200, the signal strength of the signal detected by the magneto-resistive head will be relatively strong. Finally, as the magneto-resistive stripe 100 is moved so that its trailing edge 304 becomes located atop the distal edge 308, the strength of the signal detected by the magneto-resistive head becomes relatively weak, once again. Accordingly, the signal-strength profile of a properly functioning magnetic stripe 100 resembles an inverted parabola, as shown by signal-strength profile 300.

Figure 4:
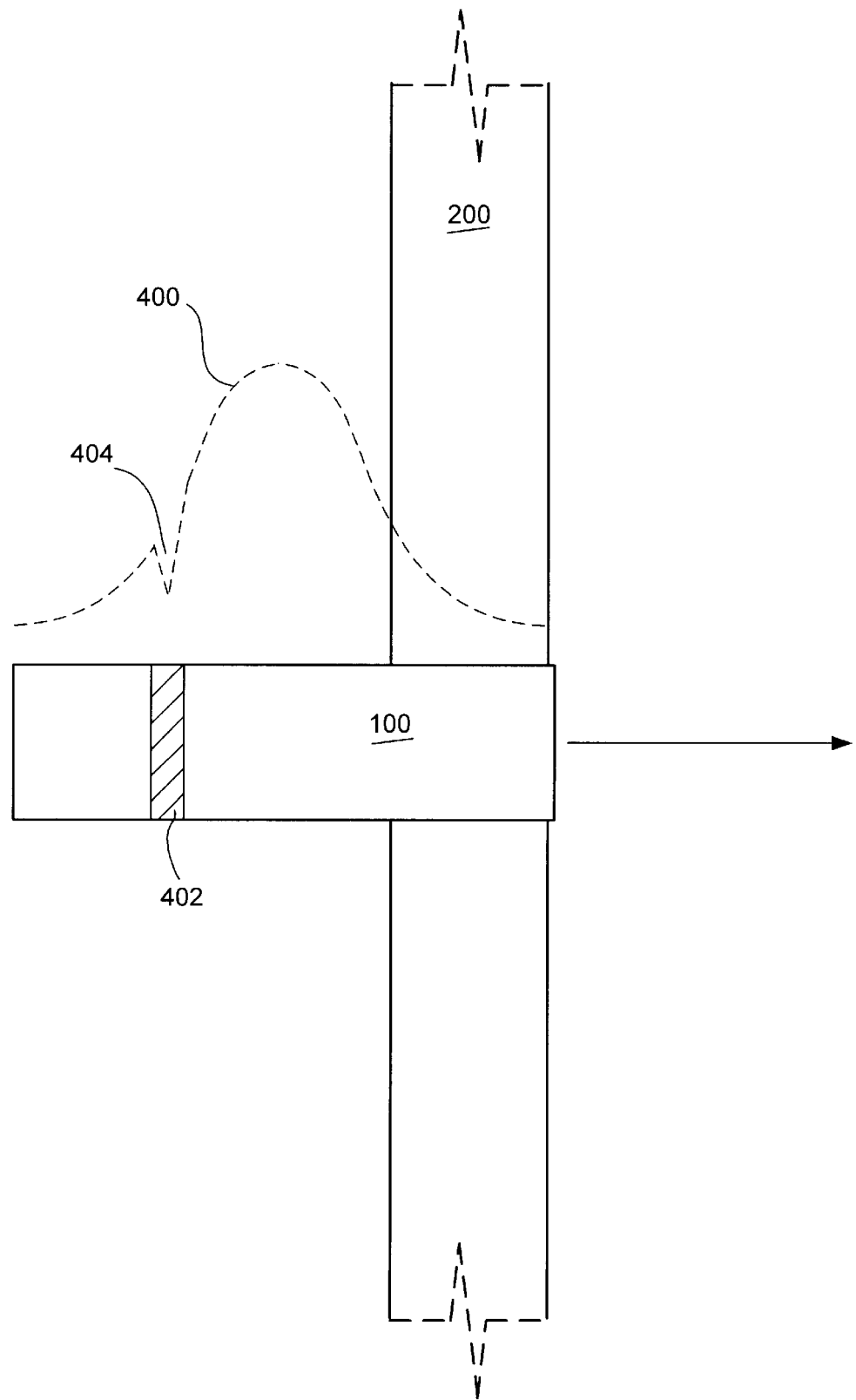
FIG. 4 depicts a magneto-resistive stripe with a magnetically insensitive region being moved across a microtrack, thereby permitting a deviant signal-strength profile to be determined.

FIG. 4 depicts a signal-strength profile 400 of a magneto-resistive stripe 100 that has a magnetically unresponsive portion 402. A magnetically unresponsive portion 402 of the stripe 100 is correlated with a negative deflection 404 in the signal-strength profile 400. Thus, a negative deflection in a signal-strength profile 400 indicates that a portion of the magneto-resistive stripe 100 is magnetically unresponsive. Further, the position of the negative deflection 404 within the signal-strength profile 400 is indicative of the position of the magnetically unresponsive region 402 of the stripe 100.

Figure 5:
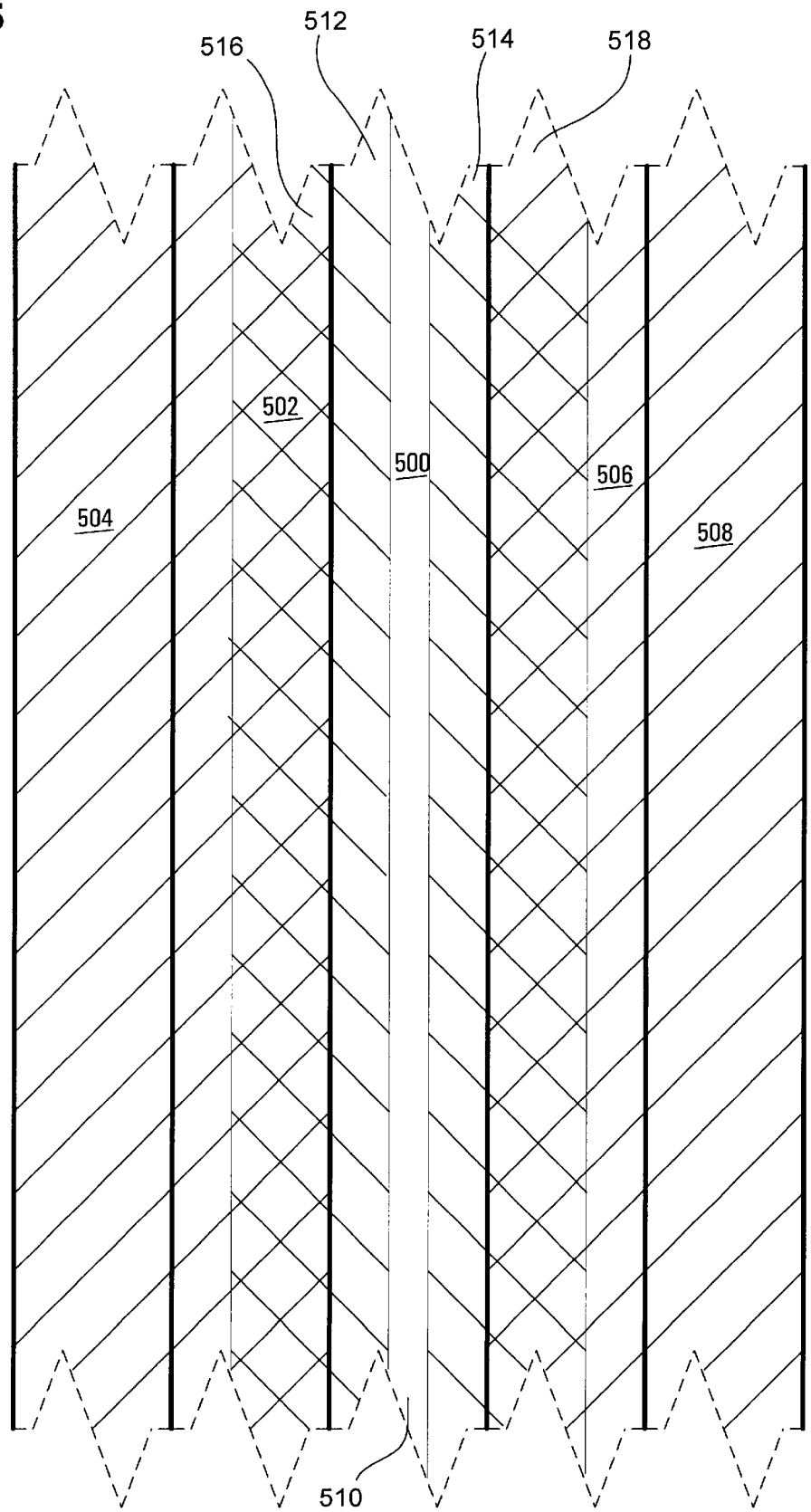
FIG. 5 depicts a set of linearized tracks, one of which has been trimmed so as to create a microtrack.

FIG. 5 depicts a set of linearized tracks 500, 502, 504, 506, and 508. In FIG. 5, track 500 is designated as the target track. This designation indicates that track 500 will be trimmed into a microtrack by the writing apparatuses of the disc drive containing the disc that contains track 500. In FIG. 5, each of the two tracks surrounding the target track 500 (tracks 502 and 504 on the left, and tracks 506 and 508 on the right) have been erased. In other embodiments, only one track on either side of the target track 500 is erased. In still other embodiments, more than two tracks on either side of the target track are erased. One method of erasing the tracks 502, 504, 506, and 508 is to perform a DC write operation throughout the portions of each track to be erased.

In addition to erasing the tracks surrounding the target track 500, target track 500 is also trimmed, thereby creating the microtrack 510. In FIG. 5, target track 500 has peripheral regions 512 and 514 erased, thus leaving only microtrack 510 with recorded data. Peripheral regions 512 and 514 may be erased by offsetting the inductive head a predetermined distance on either side of the centerline of target track 500, and then commanding a DC write over disc areas to be erased (servo sectors, for example, should not be erased if the disc drive is to continue functioning). Thus, the peripheral regions 512 and 514, along with juxtaposed disc space also falling under the inductive head, are erased. Regions 516 and 518 are erased twice: once during erasure of the tracks surrounding target track 500, and again during trimming of target track 500.

Figure 6:
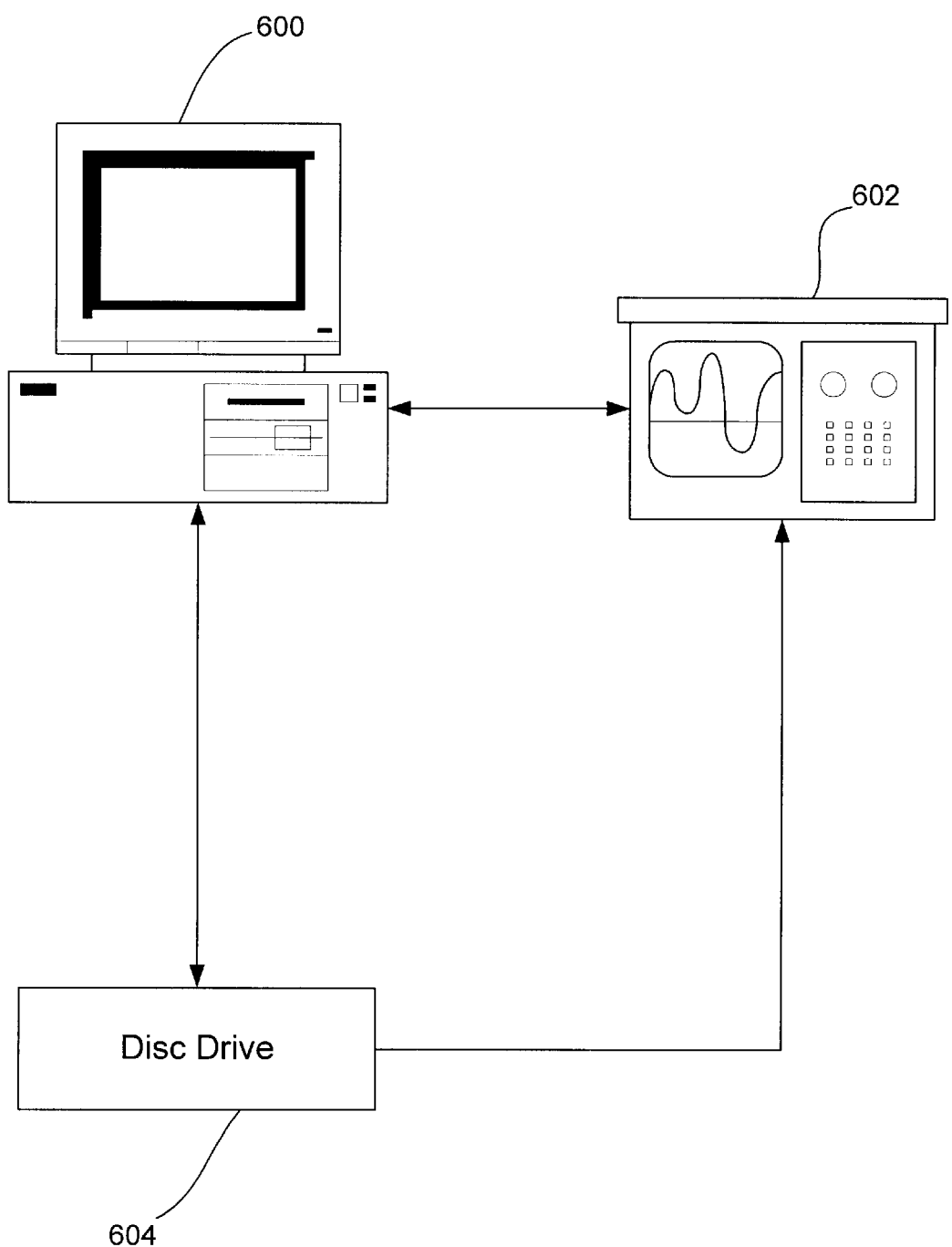
FIG. 6 depicts a test system that can be used to carry out a test to detect a defect within a magneto-resistive stripe based upon determining a signal-strength profile for the magneto-resistive stripe.

FIG. 6 depicts a test system that can be used to carry out a test to detect a defect within a magneto-resistive stripe based upon the principles described above. The test system consists of a computer 600, an oscilloscope 602, and a disc drive under test 604. The computer 600 is in communication with the oscilloscope 602 and disc drive 604. The computer may interface with oscilloscope 602 via a general-purpose interface bus (GPIB) card and with the disc drive via a corn port. The oscilloscope 602 is configured and arranged to receive commands from computer 600 and to sense an electrical signal emanating directly from a magneto-resistive head within the disc drive 604. Access to the electrical signal emanating directly from the magneto-resistive head within disc drive 604 may be obtained via test-points provided on a printed-circuit board containing the electronic control and detection hardware for disc drive 604. Additionally, access to the electrical signal emanating directly from the magneto-resistive head within disc drive 604 may also be obtained via any other electrical connection provided to make such a signal available without disassembling or destructing the disc drive 604. In one embodiment, the electrical signal emanating directly from the magneto-resistive heads of disc drive 604 may be sensed using a 1 GHz differential probe.

Figure 7:
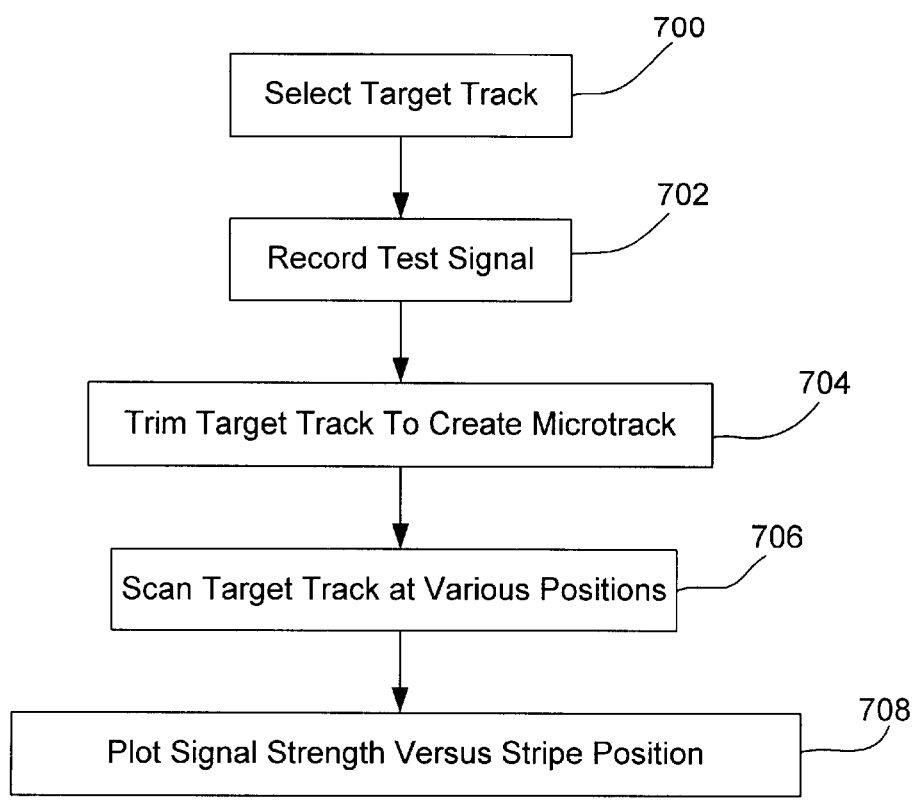
FIG. 7 depicts a set of acts that can be executed, in order to determine a signal-strength profile for a magneto-resistive stripe.
Figure 8:
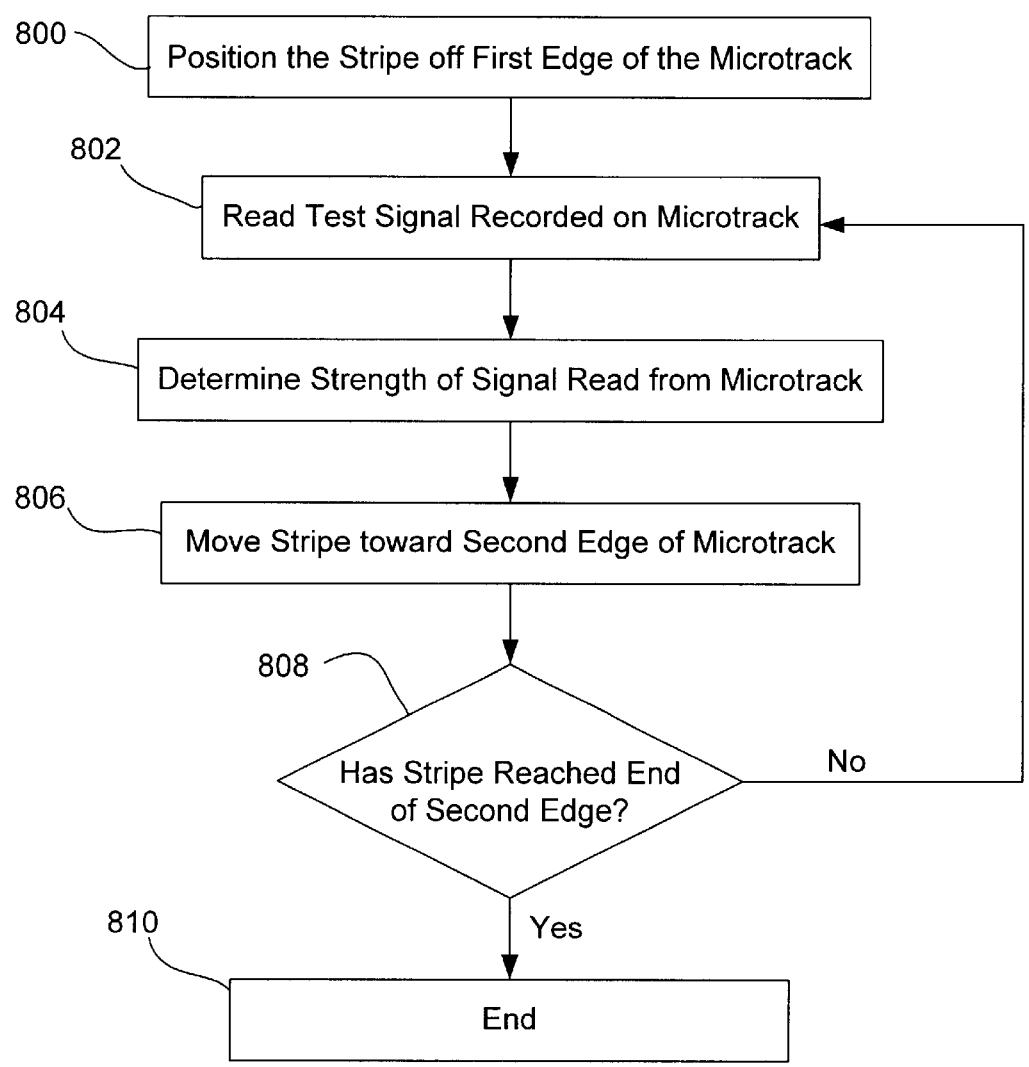
FIG. 8 depicts a set of acts that can be executed, in order to gather data necessary for creation of a signal-strength profile.

The computer 600 is loaded with a set of software instructions, the structure of which is depicted in FIGS. 7, 8, and 9. The functions and structure of computer 600 and its software as depicted in FIGS. 7, 8, and 9 may be embodied by any computing device, or may be embodied by any set of computing devices that cooperate to: (1) communicate with disc drive 604 under test; (2) communicate with oscilloscope 602; and, (3) effect the functionality revealed in FIGS. 7, 8, and 9. The software depicted in FIGS. 7, 8, and 9 may be written in any computer language (including C, C++, BASIC, Visual BASIC, etc.) and may be written with the use of a development tool, such as LabVIEW®, which is available from National Instruments.

FIG. 7 depicts a set of acts that use the control apparatuses and read/write apparatuses within an assembled disc drive under test to create a microtrack. The microtrack is used to probe the magnetic sensitivity of each portion of a magnetic stripe within a magneto-resistive head of the disc drive.

In operation 700, a target track is selected. In one embodiment, operation 700 may include the act of software executed by computer 600 prompting an operator to choose a target track. In another embodiment of operation 700, a predetermined track is selected by the software, itself. Subsequently, in operation 702, the computer 600 commands the disc drive to record a test signal along the target track. In one embodiment, the test signal is a 2-T signal (one-half the highest frequency at which the head will operate in a particular zone). Next, in operation 704, the computer 600 commands the disc drive under test 604 to trim the target track selected in operation 700, thus creating a microtrack. One possible embodiment of operation 704 is depicted in FIG. 9, below. Optionally, as a part of the trimming operation 704, the computer 600 may command the disc drive under test 604 to erase one or more consecutive tracks on either side of the target track. In one particular embodiment, two tracks on either side of the target track are erased. The effect of operations 700, 702, and 704 is to create a microtrack, using only the control apparatuses and read/write apparatuses within the disc drive itself. The microtrack is used in scanning operation 706 to test a magneto-resistive stripe on a region-by-region basis.

In scanning operation operations 706, the magneto-resistive stripe is positioned at various locales along the microtrack, a signal is read at each of the various locales, and the strength of each read signal is calculated. For each locale at which the magneto-resistive stripe is positioned, the computer 600 commands the oscilloscope to capture a signal yielded by the magneto-resistive head (prior to the signal being amplified). The computer 600 may command the oscilloscope 602 to capture a signal resulting from the magneto-resistive head having read the microtrack, in its entirety, more than once. Next, the computer 600 determines the signal strength of each signal captured by the oscilloscope (one signal per locale). One possible embodiment of the scanning operation 706 is disclosed in FIG. 8, below. Finally, in operation 708, the computer 600 displays a graphical representation of signal-strength profile, based upon the information obtained in scanning operation 706. Optionally, as a part of graphing operation 708, the computer 600 may be programmed to identify a discrepency between the plotted signal-strength profile and an ideal profile, thus identifying a defective region of the magneto-resistive stripe.

FIG. 8 depicts one possible embodiment of the scanning operation 706, the purpose of which is to: (1) position the magneto-resistive stripe at various locales along the microtrack; (2) read a signal at each of the various locales; and (3) calculate the strength of each read signal. The set of acts begins with operation 800, in which the computer 600 commands the disc drive 604 to position the magneto-resistive stripe 100 so that its leading edge 302 is located approximately atop the proximal edge 306. Next, in operation 802, the computer 600 commands the oscilloscope 602 to capture the signal resulting from the magneto-resistive head attempting to read the microtrack 200 from its current locale. In operation 804, the signal strength of the captured signal is determined. Subsequently, in operation 806, the computer 600 commands the disc drive 604 to increment the magneto-resistive stripe 100 across the microtrack 200. Finally, in query operation 808, the computer 600 checks to determine whether the trailing edge 304 of the magneto-resistive stripe has reached the distal edge 308 of the microtrack 200. If the trailing edge 304 of the magneto-resistive stripe 100 has not reached the distal edge 304 of the microtrack 200, control is passed to operation 802, and the loop is traversed once more. If, on the other hand, the trailing edge 304 of the magneto-resistive stripe 100 has reached the distal edge 308 of the microtrack 200, the loop is exited 810.

FIG. 9 depicts one possible embodiment of operation 704, in which the target track 500 is trimmed, in order to create the microtrack 200. The set of acts begins with operation 900, in which the track average amplitude of a signal detected from the target track 500 is determined. Operation 900 may be accomplished by: (1) commanding the disc drive to orient the magneto-resistive stripe 100 over the target track 500; (2) commanding the oscilloscope to capture a particular duration of the signal generated by the magneto-resistive head, as it is oriented over the target track 500; (3) integrating (either discrete integration or continuous integration) the captured signal, yielding an integrated quantity; and (4) dividing the integrated quantity by the duration of the signal. Next, in operation 902, the inductive head is offset a predetermined distance from the centerline of the target track. The predetermined distance is such that the inductive head will be oriented partially over the extremity of the target track and partially over a juxtaposed track. In operation 904, a DC write is performed, thereby causing the head to erase the region of disc over which it is oriented. Next, in operation 906, the inductive head is offset a predetermined distance from the centerline of the target track, but in the opposite direction from that of operation 902. In operation 908, another DC write is performed, again causing the head to erase the region of disc over which it is oriented. Next, in operation 910, the track average amplitude of the newly trimmed track is determined. Operation 910 may be carried out by: (1) commanding the disc drive to orient the magneto-resistive stripe 100 over the trimmed track; (2) commanding the oscilloscope to capture a particular duration of the signal generated by the magneto-resistive head, as it is oriented over the trimmed track; (3) integrating (either discrete integration or continuous integration) the captured signal, yielding an integrated quantity; and (4) dividing the integrated quantity by the duration of the signal. Subsequently, in query operation 912, the ratio of the track average amplitude of the trimmed track to the track average amplitude of the target track is compared to a predetermined ratio. If the ratio of the track average amplitude of the trimmed track to the track average amplitude of the target track exceeds the predetermined ratio, the predetermined distance by which the inductive head is offset in operations 902 and 906 is redefined to be smaller in operation 914 (so that additional track area will be trimmed from the target track), and control is passed to operation 902, so that the loop may be traversed again. If, on the other hand, the track average amplitude of the trimmed track to the track average amplitude of the target track is less than or equal to the predetermined ratio, the process is exited.

To summarize one embodiment of the present invention, a method for gathering data to detect a magnetically insensitive region of a magneto-resistive stripe in a disc drive, may be effected by performing the following acts. First, the set of acts are commenced by selecting a target track (such as in operation 700), and then recording a test signal along the target track (such as in operation 702). Next, the target track is trimmed to create a microtrack (such as in operation 704), wherein the microtrack has a microtrack width less than the stripe width and the microtrack has a first circumferential edge and a second circumferential edge. After the creation of the microtrack, the magneto-resistive stripe is scanned at various radial locales between the first and second circumferential edges of the microtrack (such as in scanning operation 706). Finally, a signal strength is determined for each of the detected signals (such as in operation 708).

The process of scanning the magneto-resistive stripe may commence by positioning the magneto-resistive stripe over the microtrack, reading the test signal recorded on the microtrack with the magneto-resistive stripe, and determining a signal strength of the signal read for each location of the magneto-resistive stripe. The process of scanning the magneto-resistive stripe may further include repositioning the magneto-resistive stripe at a different position over the microtrack, and repeating the steps of reading the test signal and determining its signal strength.

Alternatively, the process of scanning the magneto-resistive stripe may commence by positioning the magneto-resistive stripe at a location nearer to the first circumferential edge than to the second circumferential edge and outside of the region between the first and second circumferential edges (such as in operation 800). Next, the magneto-resistive stripe is used to read the test signal recorded on the microtrack, thereby producing a signal detected by the magneto-resistive head (such as in operation 802). Thereafter, a signal strength of the signal detected by the magneto-resistive head is determined (such as in operation 804). After determination of the signal strength, the magneto-resistive stripe is incrementally moved toward the second circumferential edge of the microtrack (such as in operation 806). Finally, the above steps are repeated until the magneto-resistive stripe has traversed the microtrack (such as in operation 808).

The signal strength of a detected signal may be arrived at via integrating the detected signal along a length of the microtrack, yielding an integrated quantity, and then dividing the integrated quantity by the length along which the signal was integrated. Optionally, the signal may be detected and integrated along a length of the microtrack longer than one circumference of the microtrack.

The process of trimming a target track to create a microtrack may commence by determining a first track average amplitude of the test signal recorded along the target track (such as in operation 900). Next, the inductive head is offset a predetermined distance in one direction from a centerline of the target track (such as in operation 902). Thereafter, a region of the target track beneath the inductive head (when the magneto-resistive head is offset the predetermined distance in the one direction from the centerline of the target track) is erased (such as in operation 904). Additionally, a region of the target track located beneath the inductive head (when the inductive head is offset the predetermined distance in an opposite direction from the centerline of the target track) is erased, creating a trimmed track (such as in operations 906 and 908). Next, a second track average amplitude of the test signal recorded along the trimmed track is determined (such as in operation 910). Finally, if the ratio between the second and first track average amplitudes is greater than a predetermined threshold, the predetermined distance is reduced and the above steps are repeated (such as in operations 912 and 914).

Certain optional embodiments of the above process of trimming a target track exist. The method may additionally include prompting a user to enter the predetermined threshold. Alternatively, the method may also include erasing a track lying on either side of, and adjacent to, the target track. Another alternative includes the additional step of plotting the signal strength of the detected signal against the location of the magneto-resistive head. Finally, yet another optional step of identifying a discrepancy between the plotted signal strength of the detected signal and an ideal profile may be included.

In another embodiment of the invention, a test system carries out the acts described above. The test system includes the disc drive under test (such as 604), an oscilloscope (such as 602) configured and arranged to sense a signal generated by a magneto-resistive head in the disc drive, and a computer (such as 600) configured and arranged to be in communication with both the oscilloscope and the disc drive. The computer, oscilloscope and disc drive under test cooperate to perform the above-described acts.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the magneto-resistive stripe may traverse the microtrack in any direction or in any path (not necessarily in a linear path). Additionally, the test signal may be of any known format. Numerous other changes may be made which will readily suggest themselves to those skilled in the art and which are encompassed in the spirit of the invention disclosed and as defined in the appended claims.

What is claimed is:

1. A method of gathering data to detect a defect in a magneto-resistive head in a disc drive, the magneto-resistive head having a magneto-resistive stripe, the disc drive possessing a flat, circular disc used as a recording medium, the disc being divided into a plurality of concentric tracks, each track having a track width, the magneto-resistive stripe having a stripe width, the method comprising:

(a) selecting a target track;
   (b) recording a test signal along the target track;
   (c) trimming the target track to create a microtrack having a microtrack width less than the stripe width, the microtrack having a first circumferential edge and a second circumferential edge;
   (d) scanning the target track with the magneto-resistive head at various positions to detect any defect in the magneto-resistive stripe.

2. The method according to claim 1 wherein the scanning step (d) comprises:

(d)(i) positioning the magneto-resistive stripe over the microtrack;
   (d)(ii) reading the test signal recorded on the microtrack with the magneto-resistive stripe; and
   (d)(iii) determining a signal strength of the signal read in step (d)(ii).

3. The method according to claim 2 wherein the scanning step (d) further comprises:

(d)(iv) repositioning the magneto-resistive stripe at a different position over the microtrack; and
   (d)(v) repeating steps (d)(ii) and (d)(iii).

4. The method of claim 2 further comprising:

(e) plotting the signal strength of the detected signal against the location of the magneto-resistive head.

5. The method of claim 4 further comprising:

(f) identifying a discrepancy between the plotted signal strength of the detected signal and an ideal profile of signal strength plotted against magneto-resistive head location.

6. The method of claim 1, wherein scanning step (d) comprises:

(d)(i) positioning the magneto-resistive stripe at a location nearer to the first circumferential edge than to the second circumferential edge and outside of the region between the first and second circumferential edges;

(d)(ii) using the magneto-resistive stripe to read the test signal recorded on the microtrack, thereby producing a signal detected by the magneto-resistive head;

(d)(iii) determining a signal strength of the signal detected by the magneto-resistive head;

(d)(iv) incrementally moving the magneto-resistive stripe toward the second circumferential edge of the microtrack; and (d)(v) repeating steps (ii), (iii), and (iv) until the magneto-resistive stripe has traversed the microtrack.

7. The method of claim 6, wherein the determining step (d)(iii) comprises:

(d)(iii)(1) integrating the detected signal along a length of the microtrack, yielding an integrated quantity; and (d)(iii)(2) dividing the integrated quantity by the length along which the signal was integrated.

8. The method of claim 7, wherein the detected signal is integrated along a length of the microtrack longer than one circumference of the microtrack.

9. The method of claim 1, wherein the trimming step (c) comprises:

(c)(i) determining a first track average amplitude of the test signal recorded along the target track;

(c)(ii) offsetting the magneto-resistive head a predetermined distance in one direction from a centerline of the target track;

(c)(iii) erasing a region of the target track beneath the magneto-resistive head when the magneto-resistive head is offset the predetermined distance in the one direction from the centerline of the target track;

(c)(iv) erasing a region of the target track located beneath the magneto-resistive head when the magneto-resistive head is offset the predetermined distance in an opposite direction from the centerline of the target track, creating a trimmed track;

(c)(v) determining a second track average amplitude of the test signal recorded along the trimmed track; and (c)(vi) if the ratio between the second and first track average amplitudes is greater than a predetermined threshold, reducing the predetermined distance and repeating steps c(ii) through c(vi).

10. The method of claim 9 further comprising prompting a user to enter the predetermined threshold.

11. The method of claim 9 wherein the erasing steps (c)(iii and iv) further comprise erasing a track lying on either side of, and adjacent to, the target track.

12. A system for gathering data to detect a defect in a magneto-resistive head in a disc drive, the magneto-resistive head having a magneto-resistive stripe, the disc drive possessing a flat, circular disc used as a recording medium, the disc being divided into a plurality of concentric tracks, each track having a track width, the magneto-resistive stripe having a stripe width, the system comprising:

an oscilloscope configured and arranged to sense a signal generated by the magneto-resistive head in the disc drive;

a computer configured and arranged to be in communication with both the oscilloscope and the disc drive, the computer being loaded with a set of software instructions for (a) selecting a target track;

(b) commanding the oscilloscope to record a test signal along the target track;

(c) commanding the disc drive to trim the target track to create a microtrack having a microtrack width less than the stripe width, the microtrack having a first circumferential edge and a second circumferential edge; and (d) commanding the disc drive and the oscilloscope to cooperate in scanning the target track with the magneto-resistive head at various positions to detect any defect in the magneto-resistive stripe.

13. The system of claim 12, wherein the computer being loaded with a set of software instructions for performing act (d) comprises the computer being loaded with a set of software instructions for:

(d)(i) commanding the disc drive to position the magneto-resistive stripe over the microtrack;

(d)(ii) commanding the disc drive to read the test signal recorded on the microtrack with the magneto-resistive stripe; and (d)(iii) determining a signal strength of the signal read in step (d)(ii).

14. The system of claim 13, wherein the computer being loaded with a set of software instructions for performing act (d) further comprises the computer being loaded with a set of software instructions for:

(d)(iv) commanding the disc drive to reposition the magneto-resistive stripe at a different position over the microtrack; and (d)(v) repeating steps (d)(ii) and (d)(iii).

15. The system of claim 13, wherein the computer being loaded with a set of software instructions for performing steps (a) through (d) further comprises the computer being loaded with a set of software instructions for:

(e) plotting the signal strength of the detected signal against the location of the magneto-resistive head.

16. The system of claim 15, wherein the computer being loaded with a set of software instructions for performing steps (a) through (e) further comprises the computer being loaded with a set of software instructions for:

(f) identifying a discrepancy between the plotted signal strength of the detected signal and an ideal profile of signal strength plotted against magneto-resistive head location.

17. The system of claim 12, wherein the computer being loaded with a set of software instructions for performing step (d) comprises the computer being loaded with a set of software instructions for:

(d)(i) commanding the disc drive to position the magneto-resistive stripe at a locale nearer to the first circumferential edge than to the second circumferential edge and outside the region between the first and second circumferential edges;

(d)(ii) commanding the disc drive to use the magneto-resistive stripe to read the test signal recorded on the microtrack, thereby producing a signal detected by the magneto-resistive head;

(d)(iii) commanding the oscilloscope to sense the signal detected by the magneto-resistive head;

(d)(iv) determining a signal strength of the signal detected by the magneto-resistive head;

(d)(v) commanding the disc drive to incrementally move the magneto-resistive stripe toward the second circumferential edge of the microtrack; and (d)(vi) repeating acts (ii), (iii), (iv), and (v) until the magneto-resistive stripe has traversed the microtrack.

18. The system of claim 17, wherein the computer being loaded with a set of software instructions for performing step (d)(iv) comprises the computer being loaded with a set of software instructions for:

(d)(iv)(1) integrating the detected signal along a length of the microtrack, yielding an integrated quantity; and (d)(iv)(2) dividing the integrated quantity by the length along which the signal was integrated.

19. The system of claim 18, wherein the computer being loaded with a set of software instructions for performing act (d)(iv)(1) comprises the computer being loaded with a set of software instructions for integrating the detected signal along a length of the microtrack, the length being more than one circumference of the microtrack.

20. The system of claim 12, wherein the computer being loaded with a set of software instructions for performing step (c) comprises the computer being loaded with a set of software instructions for:

(c)(i) determining a first track average amplitude of the test signal recorded along the target track;

(c)(ii) commanding the disc drive to offset the magneto-resistive head a predetermined distance in one direction from a centerline of the target track;

(c)(iii) commanding the disc drive to erase a region of the target track beneath the magneto-resistive head when the magneto-resistive head is offset the predetermined distance from the centerline of the target track;

(c)(iv) commanding the disc drive to erase a region of the target track beneath the magneto-resistive head when the magneto-resistive head is offset the predetermined distance in an opposite direction from the centerline of the target track, creating a trimmed track;

(c)(v) determining a second track average amplitude of the test signal recorded along the trimmed track; and (c)(vi) if the ratio between the second and first track average amplitudes is greater than a predetermined threshold, redefining the predetermined distance to be smaller than it originally was, and repeating acts c(ii) through c(vi).

21. The system of claim 20, wherein the computer being loaded with a set of software instructions for performing steps (c)(i) through (c)(vi) further comprises the computer being loaded with a set of software instructions for prompting a user to enter the predetermined threshold.

22. The system of claim 20, wherein the computer being loaded with a set of software instructions for performing steps (c)(iii) and (c)(iv) further comprises the computer being loaded with a set of software instructions for commanding the disc drive to erase a track lying on either side of, and adjacent to, the target track.

* * * * *